Sept. 17, 1940.                H. DOMMER                 2,215,212
                                  RELAY
                          Filed Sept. 17, 1938
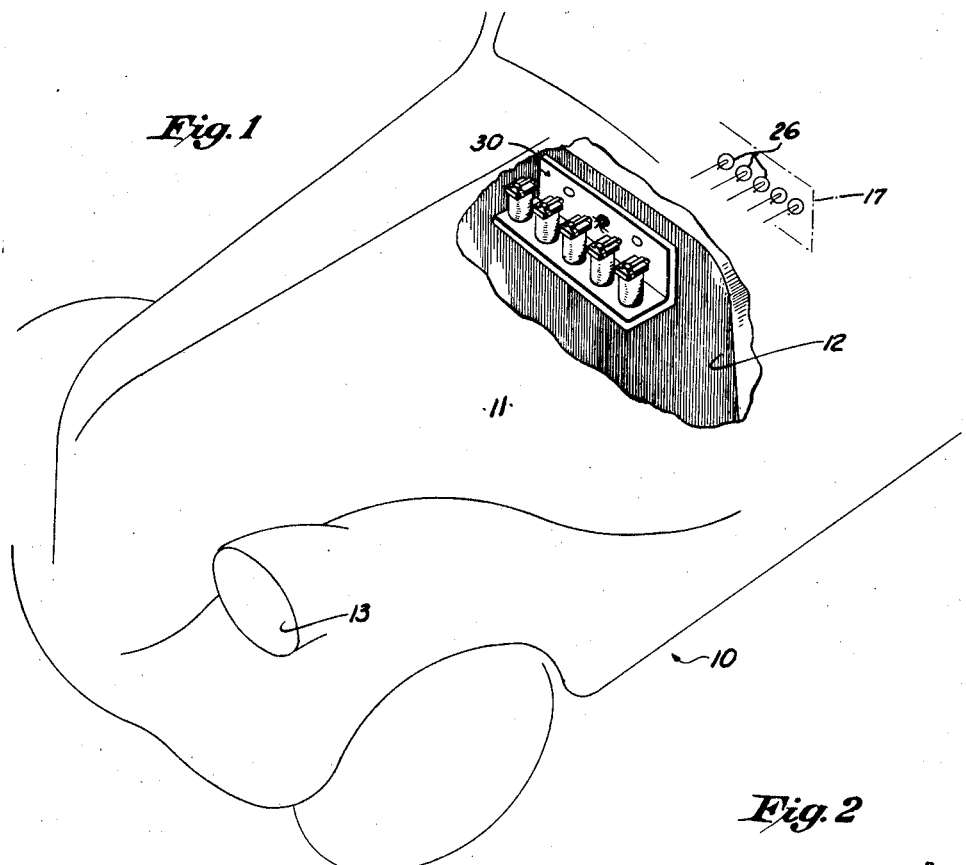
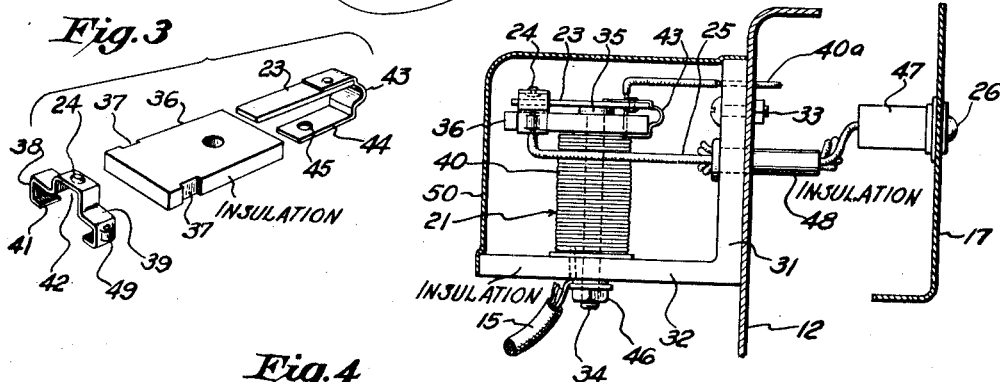
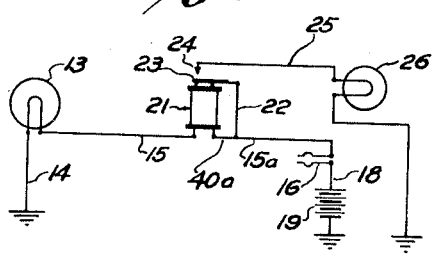
INVENTOR
Henry Dommer
BY Albert R. Henry
ATTORNEY Patented Sept. 17, 1940

2,215,212

UNITED STATES PATENT OFFICE 2,215,212

RELAY

Henry Dommer, Buffalo, N. Y.

Application September 17, 1938, Serial No. 230,524

2 Claims. (Cl. 200—87)

This invention relates to detector apparatus for automobile running lights, and it is concerned particularly with the provision of improved means for indicating the failure of any of the lamp circuits customarily included in automobiles.

It is a common experience of motorists to have a running light burn out while the car is in operation, to be unaware that one of a pair of lamps has failed until so advised by an officer or passing motorist, and to be under the necessity of turning the control switch to first one position and then the other, and get in and out of the car, in order to find out which lamp has failed. Inasmuch as the proper functioning of all of the running lights is desirable for safety reasons, and is also required by law, means should be provided to advise the driver of the failure of any one of the lamps, so that repairs or replacements may be made immediately and with a minimum of trouble.

A theoretically effective way to make such provision is to provide a detector circuit, including a signal lamp, which is energized upon the failure of any one of the main lamps. However, insofar as I am aware, proposals along this line heretofore made have been unsatisfactory, since any such provision should be inexpensive, but still positive in action and durable, and should be of such nature that the installation may be readily made by any person having a limited knowledge of electrical circuits and the use of tools.

Accordingly, the present invention has as its primary object the devising of detector apparatus which is cheap to manufacture, which is rugged and durable under the severe service conditions under which it is employed, and which may also be readily installed in any automobile of conventional design. A preferred embodiment of the invention, as the same is reduced to practice, is illustrated in the accompanying drawing, wherein:

Fig. 1 is a diagrammatic perspective of the front end of a passenger automobile, showing the detector apparatus applied thereto:

Fig. 2 is a section through the detector apparatus, showing the mode in which it is positioned in the vehicle;

Fig. 3 is an expanded perspective of some of the parts of the detector; and,

Fig. 4 is a wiring diagram, showing how the detector circuit becomes energized upon failure of the running lamp or its circuit.

Referring first to Fig. 1, there is shown in outline the front end 10 of a conventional passenger automobile, having an engine compartment 11 which is separated from the passenger compartment by a partition wall 12. The automobile carries a number of running lights 13 (only one of which is shown), and which are usually the right and left front dim and bright lights, and the tail light. The usual method of wiring these lights is shown in Fig. 4. One side of any of the lights 13 is connected by wire 14 to the ground, while the other side of the light 13 is connected, through a wire 15, to a switch 16 located on the instrumental panel 17 in the passenger compartment. The opposite side of switch 16 is connected through a wire 18 to one side of the battery 19, the other side of which is connected to the ground, thus completing the circuit.

Parallel circuits are provided between the right and left hand front lights, for both dim and road positions, either of which set of circuits may be energized by properly positioning the manual control switch 16. The tail light circuit is also connected in parallel to both pairs. In some cars, there is a third switch position, employed for very dim or parking lights, and when the invention is installed on a car so equipped, it is to be understood that additional detector circuits may be provided if so desired.

Having thus described the conventional features of an automobile and its lighting circuits with which the present invention is particularly concerned, it may be noted here that, as will be apparent from an inspection of the circuit just described, the failure of the lamp, or the breaking of the circuit at any point, causes that particular circuit to open. The present invention deals with means for signalling or indicating that failure when it is caused for any reason other than the intentional shifting of the switch 16.

Referring still to Fig. 4, this is accomplished by providing an auxiliary circuit in the following manner: Wire 15, which normally leads from the switch through the partition 12 to the specific lamp under consideration, is cut, and the ends 15 and 15a are connected to the leads of the magnet coil of a relay 21. A shunt circuit is then established by connecting wire 15a, leading from the switch 16, through wire 22 to the armature 23 of the relay 21. Contact point 24 of relay 21 is then connected through wire 25 to a signal lamp 26, mounted on the instrument panel, while the other side of the signal lamp is connected to the ground.

When running light 13 is in good order, the manual closing of the switch 16 establishes the circuit for the lamp in the manner heretofore described, except that the circuit is now also taken through the coil of relay 21 (by connecting wire 15a to wire 40a), thereby energizing this coil. The magnetic attraction causes armature 23 to move away from contact point 24, thereby opening the shunt circuit at this point. If, however, the running light should fail, then coil 21 is deenergized, and a circuit is established for detector light 26, through battery 19, wire 18, switch 16, wires 15a and 22, armature 23, point 24, wire 25, lamp 26, and thence to the ground and return to the battery.

When switch 16 is opened, current cannot flow through either the running circuit nor the detector circuit, and thus the detector lamps function only when intended, namely, when there is a failure of the running lamps during a period of desired use.

I will now describe in detail the apparatus employed in connection with the relay 21. As best shown in Figs. 1 and 2, an L-shaped bracket member 30, having upright and projecting panels 31 and 32, is secured in the engine compartment, and on the partition 12, by means of screws 33. This bracket member is preferably made of hard rubber, synthetic resin, or like material, to be both sufficiently durable and also non-conducting. A plurality of threaded iron or steel posts extend upwardly from the projecting flange 32, one post being provided for each relay 21 which is included in the assembly. The headed ends 35 of the posts 34 abut blocks 36, also of insulating material, and the space between the blocks 36 and the flange 34 is occupied by a winding 40 of insulated wire, constituting the coil proper of the relay 21.

As best shown in Fig. 3, each block 36 is provided with aligned rectangular notches 37 in which are disposed the upright arms 38 of a bridge member 39, on the under side of which is located the contact point 24. It will be apparent from Fig. 3 that the arms 38 resiliently engage the notches 37, while the inwardly projecting portions of the bridge above the arms engage the top of the block, and the lower portions 41 of the arms 38 are turned under the block 36, thus providing a rigid mounting for the bridge. The central portion of the bridge 39 is elevated by bending the metal of which it is formed, thereby leaving a space 42 beneath the contact point 24 for the movement of the armature 23.

As also shown in Fig 3, the armature 23 is formed of a strip of ferrous metal, which is secured at one end to a spring member 43 having an arm 44 engaging the under side of the block 36, and being secured in place by the post 34 which passes through the aperture 45 thereof. To assemble the relay, the threaded post 34 is first pushed through the illustrated apertures in the block 36 and spring member 43, and the winding 40 is applied. One end of this winding is secured to the member 43, thus making the electrical connection from the winding to the armature which is indicated by the wire 22 in Fig. 4, while the other end of the winding is connected to the post 34. When the winding is completed, the sub-assembly is mounted on the panel 32, and is secured in place by the nut 46. As many of these coils as are desired are mounted on the panel, and there is thus provided a simple assembly, ready to be installed in the automobile.

In making the installation, the panel member 30 is mounted on the partition 12, at some accessible place, by drilling suitable holes for the reception of the holding screws 33. Then each lead from the switch 16 is cut, and the switch end 15a of such wire is connected to the free end 40a of coil 40, while wire 15 of the running light circuit is connected to the post 34. The instrument panel is then also drilled to receive detector light sockets 47, and the lamp wires 25 are taken through an insulating bushing 48 (also passing through the upright panel 31) to the several bridge members 39, where they are connected in the receiving aperture 49 formed on one of the arms 38.

To protect the assembly from dust, a cover plate 50 is provided, which may be made of light sheet metal, so that it can be readily snapped on or pried off of the panel 30.

The panel 30 has been described as being mounted in the engine compartment, because the space in back of the instrument panel 17 is usually well occupied by various controls and apparatus, and it is simpler to make the installation from the engine compartment than under the instrument panel. It will, however, be understood that the panel 30 may be located within the passenger compartment, if desired. It should also be understood that the detector lamps 26 may be mounted in a separate casing which may be assembled as a unit in or on the instrument panel, or other point where they will be readily visible to the driver.

It will thus be appreciated that the present invention provides a simple and inexpensive detector apparatus, which is durable in construction and hence unlikely to fail in service, and which may readily be installed by persons having only a casual knowledge of automobiles and tools, as well as skilled mechanics. No material modifications of the control switch 16, or of the circuits, except as set forth above, are required, and the operation of the running lights is not interfered with. When the lights are burning properly, the detector lamps 26 are not illuminated. However, if a running light in service should fail, the relay for that lamp is deenergized, and the corresponding detector lamp is illuminated through the circuits described. The driver is therefore immediately advised of the failure, and knows which running light requires replacement.

While the invention has been described with reference to a specific embodiment thereof, it will of course be understood that departures may be made therefrom without departing from the scope of the invention, as set forth in the following claims.

I claim:

1. Detector apparatus particularly adapted for automobile running lights comprising a mounting panel formed of insulating material having angularly disposed bracket members, means on one of said bracket members for mounting the panel on an automobile, the other of said bracket members being formed with an aperture, an upright post disposed in said other bracket and through said aperture, said post having an upper headed end, an insulating block positioned transversely of said post and abutting said headed end, a magnet coil wound around said post and between said block and said bracket in which said post is mounted, a contact bridge mounted on said block and transversely thereof, an armature mounted on said block, said armature having a movable portion disposed over said headed end and contacting said bridge when the magnet coil is deenergized, means for securing said post to said other bracket member, and electrical connections for effecting one circuit through said coil and another circuit through said bridge and armature.

2. Detector apparatus particularly adapted for automobile running lights comprising a panel adapted to be mounted in an automobile, an upright post mounted in said panel, a head for said post disposed above and in spaced relation to said panel, a block of insulating material positioned on said post and abutting said head, said block being formed with spaced notches, a bridge disposed transversely of said block and having arm portions disposed in said notches and engaging the faces of said blocks, said bridge portion having an elevated central portion, an armature member disposed longitudinally of said block, said armature member being in the form of a clip having one portion engaging the under side of the block and encircling said post, and another portion mounted on the upper side of the block and movable to contact respectively the head of the post and the raised portion of the bridge in opposite positions, a magnet coil wound around said post and interposed between the under side of said block and said panel, and electrical connections between the coil and post and the post and armature, whereby the coil may be placed in series in one electric circuit and the armature and bridge may be placed in series with an associated circuit.

HENRY DOMMER.